A. FRISCH.
INDICATING MECHANISM.
APPLICATION FILED APR. 1, 1912.
1,041,061.
Patented Oct. 15, 1912.
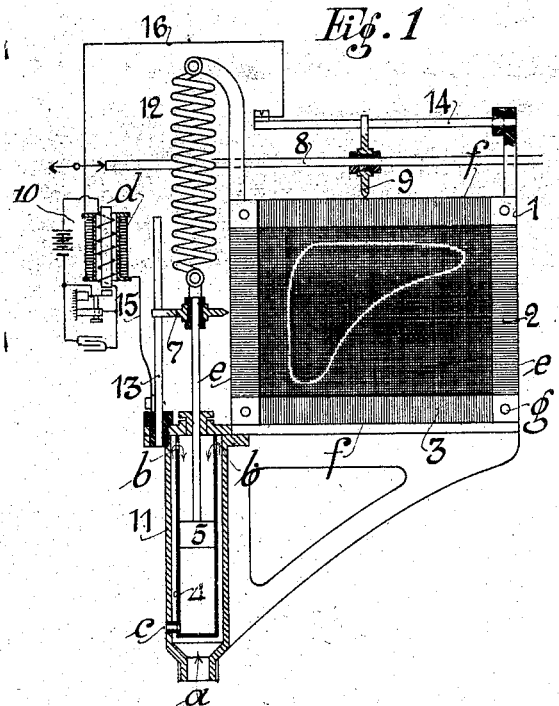
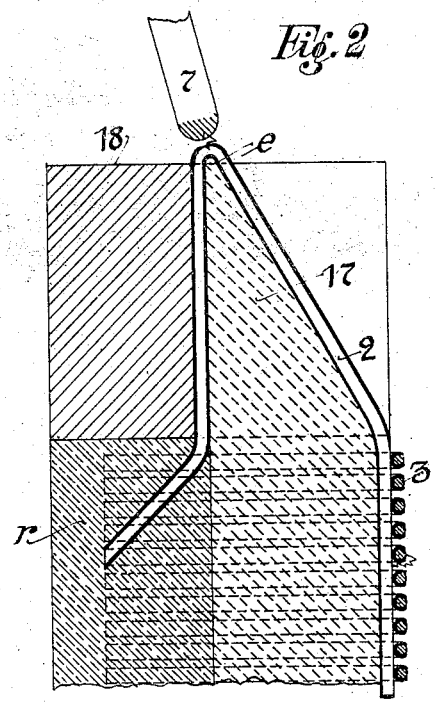
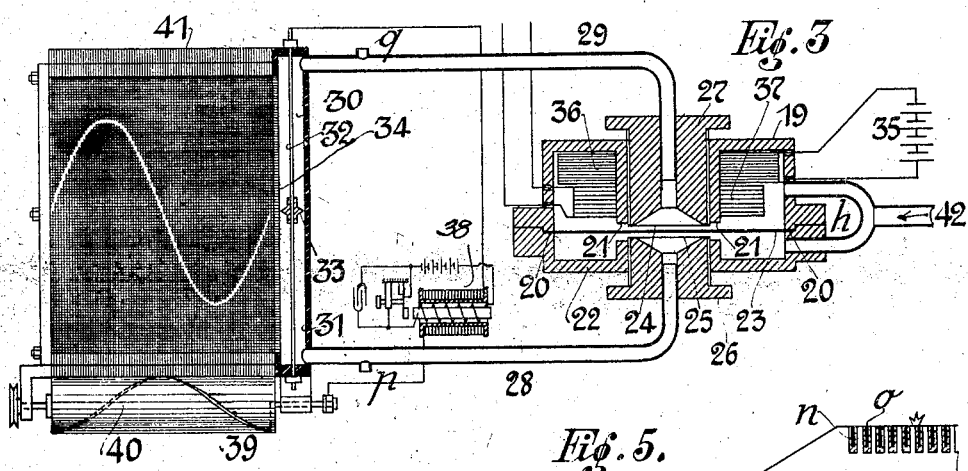
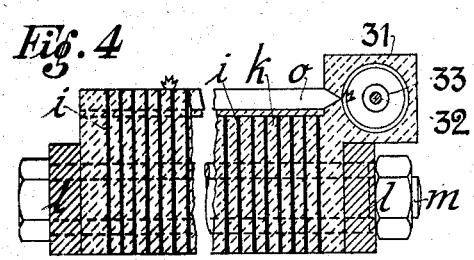
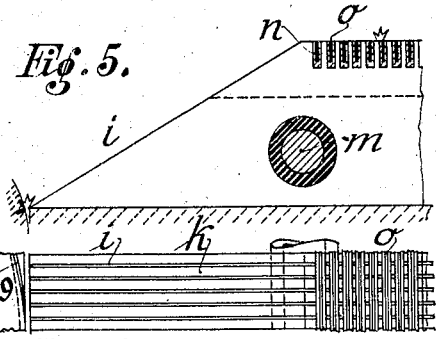
Witnesses.
Charles B. Brompton
Thos. O'Connor
Inventor.
August Frisch.
By Croydon Marko
Attorney.

UNITED STATES PATENT OFFICE.

AUGUST FRISCH, OF ZÜRICH, SWITZERLAND.

INDICATING MECHANISM.

1,041,061.     Specification of Letters Patent.     Patented Oct. 15, 1912.

Application filed April 1, 1912. Serial No. 687,637.

*To all whom it may concern:*

Be it known that I, AUGUST FRISCH, a citizen of the Swiss Republic, and residing at No. 1 Zellerstrasse, Zürich, Switzerland, have invented certain new and useful Improvements in Indicating Mechanism, of which the following is a specification.

This invention relates to indicating apparatus for representing physical phenomena or events constituted of two motions occurring in a coördinate system with axes at right angles in such a manner that the progress of the said physical phenomena or events can be directly observed. Such events are, for example, the conditions of steam and gases in the power cylinder of engines and the like during a piston stroke, the changes in the E. M. F. in alternating currents during a period and others.

The present invention has for object improved apparatus for the representation of such phenomena or events, and consists substantially in arranging electric conductors so as to form the abscissæ and ordinates of the coördinate system, and causing electric sparks to jump between these conductors in such manner that the line of sparks alters its position in conformity to the movements to be represented. The line of sparks is visible to the eye and owing to the rapid succession of the sparks they appear as a luminous line representing the progress of the physical events. The intercrossing conductors may be arranged as single movable bars or as groups of parallel fixed bars.

Devices are already known by means of which indicator diagrams are represented in optical manner by means of lenses and mirrors, and also devices for the same purpose in which electric sparks are used. The optical devices are however very costly and their operation is difficult, while the known types of device in which electric sparks are employed do not represent the events in visible manner as they occur, but merely trace the curve or diagram on an inserted sheet of paper for the purpose of subsequent inspection. There is no apparatus known to me, however, by means of which the conditions of steam and gases in the power cylinders of engines and the like, the flow of alternating currents in respect to instantaneous E. M. F.'s, phase displacements, and the like, can be directly observed as they occur, by means of electric sparks.

In the accompanying drawings: Figure 1 is an embodiment of the invention as applied to apparatus for the representation of indicator diagrams. Fig. 2 is a partial section through the viewing screen of the same apparatus. Fig. 3 is an illustration of an embodiment of the invention as applied to an oscillograph or apparatus for the instantaneous representation of alternating currents. Fig. 4 is a partial cross section through the viewing screen of this last apparatus. Fig. 5 is a section through the same viewing screen at right angles to that of Fig. 4. Fig. 6 is a view of a part of the same screen from the viewing side. Figs. 1 and 3 are diagrammatic, the parts not being in their proper proportions but rather so represented as to bring out the main features of the invention. The remaining figures illustrate the parts several times their true size.

If two metal bars crossing each other at right angles and at a small distance apart are connected at one end, say to the secondary of a spark coil, the other two ends being insulated, at the place of crossing there will be a chain of sparks. If one bar is moved laterally with a certain velocity corresponding to one of the motions of the physical events, while the second bar is similarly moved in conformity with the other motion, the point where the chain of sparks arises will vary and if the motions are sufficiently rapid will appear to the eye as a continuous luminous line the course of which will correspond to the events being represented. In carrying out this principle in practice it is found preferable however to use instead of two movable bars, two groups of parallel fixed metal bars or conductors, the ends of which successively come into contact with other conductors moving in the directions of the component motions of the events, which other conductors each have one of their ends connected to the secondary terminals of a spark coil, while their remaining ends are insulated. The apparatus shown in Figs. 1 and 3 are built upon this principle.

The apparatus of Fig. 1 consists essentially of a viewing screen or table 1, with groups 2 and 3 of crossing conductors, a cylinder 4 in which works a piston 5 on the end of a piston rod 6, an electrically insulated disk 7 mounted on the other end of the rod 6 a rod 8 also carrying an electrically insulated disk 9 and a spark coil 10 of known type. The cylinder 4 is in communication by means of its surrounding jacket 11 with the working cylinder of the engine or the like on which the experiment is being made, the steam or gas mixture entering at $a$ being admitted behind the piston 5 through the openings $b$ so as to force in the piston against the tension of a spring 12 which draws the piston back to zero position when the fluid under pressure is allowed to escape from the cylinder. To insure that the pressure on the other side of the piston is atmospheric, an opening $c$ is provided leading from the inside of the cylinder 4 to the outer air. During the movement of the piston the disk 7 slides along with one side in contact with an insulated bar 13 and its other side in contact with the group 2 of conductors. The rod 8 is connected through a suitable reducing gear with the piston rod of the engine or the like so that the disk 9 performs a reduced copy of the piston motion, one side of the disk sliding in contact with an insulated bar 14 and the other in contact with the ends of the conductors in group 3. The bars 13 and 14 are connected by leads 15 and 16 to the secondary terminals of the spark coil 10, whereby electric sparks jump across the crossing place of the conductors in groups 2 and 3 which are instantaneously in contact with the disks 7 and 9, which sparks owing to the continuous shifting of their origin trace out the above mentioned luminous line, forming in this case the indicator diagram. A suitable viewing screen or table for these lines or curves, in which the conductors 2 and 3 are of wire, can be made as follows: In Fig. 2, 17 denotes a rectangular plate of glass or other insulator with beveled edges $e$, $f$ which plate is wound continuously in the same direction with wire of about 0.3 mm. diameter covered with an insulating coating of enamel of about 0.02 mm. thickness which can resist a tension of about 2,000 volts. The side of these windings turned toward the onlooker is wiped over with a hot iron so that the enamel insulation on this side is melted away, exposing the bare wire. The same is done where the wires pass around the edge $e$, along the line wiped over by the disk 7. A second layer of wire is then wound double at right angles to the first layer of wire and passing around the edges $f$, the insulation on the viewing side and along the edge $f$ wiped over by the disk 9, being melted away as before. One of the two wires is then wound off so that the distance between the remaining windings is uniform. The winding thus made is firmly attached to the plate 17 by means of an insulating frame 18 and screws $g$. Finally the ends of the wire are bent upward and kept separate and away from each other by means of an insulating substance $r$ run in in molten condition and allowed to set. Alternating current wave diagrams can be represented in a similar manner by connecting to the spark coil of the apparatus a helically wound insulated conductor rotating synchronously with the frequency of the alternating current and which comes successively into contact with the ends of one of the groups of conductors of the view table; while the ends of the second group of conductors are brought into contact with an insulated conductor likewise connected to the spark coil, which conductor is reciprocated in conformity with the instantaneous E. M. F.'s of the alternating current. As however the number of alternations in a second is very large, the mass of the respective conductor must be very small in order that it may be able to follow the alternations, for this reason the conductor must be of special construction and the means for imparting to its motions must be such that every alternation is immediately and correctly transmitted. This result is obtained in the oscillograph of Fig. 3 by making the conductor of exceptionally small weight and imparting to it its reciprocation through the agency of the difference in pressure between two air columns, generated by the alternating current which is to be represented.

In Fig. 3, 19 is an iron box constituting a bell magnet, 20 and 21 being the poles and 22 the cover. Between the box and the cover there is clamped an iron membrane 23 which forms the connection between the two poles and which can vibrate between the ends 24 and 25 of two plugs 26, 27 adjustably screwed in the box and cover. From the spaces in the box in front of and behind the diaphragm 23, tubes 28 and 29 lead to the ends of a boring 30 in a member 31 made of insulating material, through which boring a thin steel wire 32 is centrally stretched. On this wire is loosely threaded a light piston 33 which works in the boring with a small degree of clearance. The sharpened ends of metal strips 34 lie flush with one of the inner walls of the boring these metal strips constituting one group of the intercrossing conductors. An annular coil 36 of insulated copper wire is provided for magnetizing the box and is energized with direct current from a battery 35, while a second annular exciting coil 37 is traversed by the alternating current to be represented. The steel wire 32 is in conductive connection with one terminal of the secondary of a spark coil 38, and the other end is connected to a metal bar 39 which is wound once in a helix around a roller 40 of insulating material. This roller is driven by a motor which revolves synchronously to the frequency of the alternating current to be represented. As the roller revolves the bar 39 successively comes in contact with the likewise pointed ends of the metal strips 41 composing the other group of the intercrossing conductors. The plugs 26 and 27 are so adjusted that the diaphragm 23 tensioned by the magnetizing of the box is retained in exact central position between the two ends 24, 25. A tube 42 provided with forked branches $h$ admits air at above atmospheric pressure to both sides of the diaphragm 23 and the piston 33. The tubes 28 and 29 leading to the boring 30 contain openings $p$ $q$ of smaller area than the tubes, through which openings the air introduced can escape so that no additional compression takes place. When compressed air is admitted into the magnetized box, columns of compressed air of exactly the same height are established on both sides of the diaphragm 23, which columns hold the piston 33 at the point of middle pressure. When the alternating current is allowed to flow through the coils 37 and when this current is in the same direction as the magnetizing current, the magnetization is strengthened, whereby the diaphragm is pulled toward the pole 21 and the air passage between the diaphragm and the plug 27 made narrower. This produces a diminution in the air pressure in the tube 29 and therefore a displacement of the piston 33 toward this tube. When the directions of the alternating current and the magnetizing current are opposite, the diaphragm 33 is repelled from the pole 21, the air passage on the side of the plug 26 is narrowed and the air pressure in the tube 28 diminished, so that the piston is now pushed over toward the tube 28. As the diaphragm 23 follows all the changes in the current like the diaphragm of a telephone, and creates corresponding alternations of air pressure in the tubes 28 and 29 which act upon the piston 33 as described, so that the reciprocation of this piston is a representation of the alternations in the E. M. F. of the alternating current. In its motion the piston 33 transmits the sparking current received by it through the lead 32, successively to the conductors 34 and gives rise to the jumping of sparks at the crossing of the conductors in the groups 34 and 41 in which the spark current is instantaneously flowing. The piston 33 is very small and of aluminium so that its motion can closely follow the variations in the air pressure and thus provide a reliable representation of the corresponding alternations in the E. M. F.

A circuit controlling apparatus like the one just described and shown in Fig. 3 at the right of the viewing table may be also provided in connection with the opposite ends of conductors 34, and by suitable modifications various different indicator effects may be produced.

Figs. 4 to 6 illustrate a modification of the viewing table or screen, which obviously may be used with either of the apparatus described. Pointed metal strips $i$ and insulating strips $k$ of equal breadth are pressed together by means of iron bars $l$ and insulated bolts $m$, grooves $n$ are milled in the surface of the screen or table and metal strips $o$ embedded in these grooves, the metal strips being covered with insulating enamel. The enamel is melted off the viewed face of these metal strips $o$ by means of a hot iron so that the table appears as a surface of crossing strips of bare metal embedded in insulating strips.

Having now described my invention what I claim as new and desire to secure by Letters Patent is:—

1. In indicating apparatus, the combination of a diagram screen, two series of conductors arranged substantially at right angles to each other and visibly placed upon said screen, sparking apparatus, and means including movable contacts for producing upon said screen a continuous, visible, living diagram of electric sparks.

2. In indicating apparatus, the combination of a diagram screen, two sets of transversely arranged parallel conductors on the face of the said screen, sparking apparatus, movable contacts, and means for moving said contacts in relation to the conductors so that a continuous visible moving diagram of electric sparks is produced between said conductors upon the face of the screen.

3. In indicating apparatus, the combination of a diagram screen, sets of transversely arranged parallel conductors thereon, a movable contact for one set of conductors moving in accordance with one physical condition of a machine to be tested, another movable contact for the other set of conductors moving in accordance with another physical condition in said tested machine, and sparking apparatus whereby a living visible diagram of electric sparks is produced upon said screen showing conventional momentary conditions in said tested machine.

4. In indicating mechanism, the combination of a diagram screen, transversely arranged conductors thereon, sparking apparatus and means operated jointly by mechanical movement and electrical conditions in an electric machine to be tested for changing the sparking point between said conductors, whereby a living visible diagram of conditions in said machine is produced upon the screen.

5. In indicating mechanism, the combination of a screen, two sets of parallel conductors arranged substantially at right angles thereon, a movable contact for one set of conductors operated mechanically in accordance with the frequency of the circuit of an electric machine to be tested, a moving contact for the other set of said conductors, and means actuated by wave amplitude in said circuit for moving said last named contact.

6. In indicating mechanism, the combination of a screen, transversely arranged sets of parallel conductors thereon, a movable contact for one set of conductors operated mechanically in accordance with the frequency of the circuit of an electric machine to be tested, a movable contact for the other set of conductors, motor means for moving said last named contact, and means actuated by wave amplitude in said circuit for controlling said motor means.

7. In indicating mechanism, the combination of a diagram screen, two sets of parallel conductors arranged at substantially right angles to each other thereon, a movable contact for one set of conductors operated mechanically in accordance with the frequency of the circuit of an electric machine to be tested, a second contact for the other set of conductors, sparking means in circuit with said contacts and conductors, motor means for moving said second contact, and a controller for said motor means comprising an electromagnet in circuit with said electric machine whereby said second contact is rapidly moved in accordance with wave amplitude in said circuit.

8. In an oscillograph, a group of parallel insulated abscissæ conductors, a group of parallel insulated ordinate conductors arranged at sparking distance from the first group, a sliding contact piston coöperating with the ends of the abscissæ conductors and situated at the point of middle pressure of a double air column the two limbs of which are normally balanced, a magnetized box, a diaphragm in the box dividing the interior of same into two spaces in communication with the limbs of the column, adjustable plugs one on each side of the diaphragm and determining a narrow gap between each plug and the diaphragm, a magnet coil traversed by the alternating current to be indicated and adapted to set up vibrations in the diaphragm, means for maintaining a stream of compressed air through the system, an insulated conductor coiled in a single helix and coöperating with the ends of the ordinate conductors, means for rotating the helix in synchronism with the alternating current, and a spark coil the secondary of which is connected to the sliding contact piston and to the helical conductor.

9. In an oscillograph, a plate of insulating material; a group of parallel abscissæ conductors wound on the plate, insulated with enamel, and bared on one face; a group of like similarly wound ordinate conductors arranged with the bared faces at sparking distance from the bared faces of the conductors of the first group; an insulating frame binding the plate and conductors into an integral viewing screen or table; run in insulating substance separating the conductors; a sliding contact piston coöperating with the ends of the abscissæ conductors and situated at the point of middle pressure of a double air column, the two limbs of which are normally balanced; a magnetized box; a diaphragm in the box dividing the interior of same into two spaces in communication with the limbs of the column; adjustable plugs one on each side of the diaphragm and determining a narrow gap between each plug and the diaphragm; a magnet coil traversed by the alternating current to be indicated and adapted to set up vibrations in the diaphragm; means for maintaining a stream of compressed air through the system; an insulated conductor coiled in a single helix and coöperating with the ends of the ordinate conductors; means for rotating the helix in synchronism with the alternating current; and a spark coil the secondary of which is connected to the sliding contact piston and to the helical conductor.

In testimony whereof I affix my signature in presence of two witnesses.

AUGUST FRISCH.

Witnesses:
  CARL GUBBER,
  AUGUST RAIEGG.

---

Copies of this patent may be obtained for five cents each, by addressing the "Commissioner of Patents, Washington, D. C."